United States Patent [19]
Levin

[11] Patent Number: 6,130,882
[45] Date of Patent: Oct. 10, 2000

[54] METHOD AND APPARATUS FOR CONFIGURING A COMMUNICATION SYSTEM

[75] Inventor: Howard E. Levin, Austin, Tex.

[73] Assignee: Motorola, Inc., Schaumburg, Ill.

[21] Appl. No.: 08/937,759

[22] Filed: Sep. 25, 1997

[51] Int. Cl.[7] .................................................. G08C 15/00
[52] U.S. Cl. ............................................................ 370/252
[58] Field of Search .................................. 370/241, 252, 370/253, 468, 522; 455/9, 10, 67.1, 67.3

[56] References Cited

U.S. PATENT DOCUMENTS

| | | | |
|---|---|---|---|
| 5,400,322 | 3/1995 | Hunt et al. ............................... | 370/468 |
| 5,479,447 | 12/1995 | Chow et al. ............................. | 370/468 |
| 5,751,701 | 5/1998 | Langberg et al. ....................... | 375/281 |
| 5,751,716 | 5/1998 | Tzannes et al. ......................... | 370/468 |
| 5,812,599 | 9/1998 | Van Kerckhove ...................... | 370/468 |
| 5,852,630 | 12/1998 | Langberg et al. ....................... | 375/219 |
| 5,852,633 | 12/1998 | Levin et al. ............................. | 375/260 |
| 5,903,608 | 5/1999 | Chun ....................................... | 375/260 |

Primary Examiner—Huy D. Vu
Assistant Examiner—Jasper Kwoh

[57] ABSTRACT

The present invention comprises a remote terminal (20) and a central office (30) as part of and ADSL system (10). Once a communication channel is open between the remote terminal (20) and the central office (30), the remote terminal (20) transmits channel specific information, application specific information, or both to the central office (30). Once the central office (30) receives the information, the central office (30) can select data rate options optimized for the downstream receiver (the remote terminal (20)). Based on the application specific and/or channel specific information, the central office (30) can use a combination of calculations and look-up tables to formulate new options. When the remote terminal (20) sends channel specific information, the central office (30) can perform calculations which determine performance margins at various data rates.

8 Claims, 4 Drawing Sheets

| SNR TABLE ||
| :---: | :---: |
| BITS | SNR$_{REF}$ |
| 2 | 14 |
| 3 | 19 |
| 4 | 21 |
| 5 | 24 |
| 6 | 27 |
| 7 | 30 |
| 8 | 33 |
| 9 | 36 |
| 10 | 39 |
| 11 | 42 |
| 12 | 45 |
| 13 | 48 |
| 14 | 51 |
| 15 | 54 |

*FIG.3*

METHOD AND APPARATUS FOR CONFIGURING A COMMUNICATION SYSTEM

CROSS-REFERENCE TO RELATED APPLICATIONS

A related application entitled "Method for Allocating Data in a Data Communication System," by Levin, and having Attorney Docket No. SC02954A and application No. 08/660,380, has been previously filed.

FIELD OF THE INVENTION

This invention relates generally to a communication system and more specifically to a method and apparatus for determining performance margin and data rate for a Rate Adaptive Digital Subscriber Line (RADSL).

BACKGROUND OF THE INVENTION

In order to make high data rate interactive services such as video conferencing and internet access available to more residential and small business customers, high speed data communication paths are required. Although fiber optic cable is the preferred transmission media for such high data rate services, it is not readily available in existing communications networks, and the expense of installing fiber optic cable is prohibitive. Current telephone wiring connections, which consist of copper twisted pair media, were not designed to support the high data rates required for interactive services such as video on demand or even high speed internet connections. Asymmetric Digital Subscriber Line (ADSL) technology has been developed to increase the transmission capabilities with the fixed bandwidth of existing twisted pair connections, allowing interactive services to be provided without requiring the installation of new fiber optic cable.

Discrete Multi-Tone (DMT) is a multi-carrier technique that divides the available bandwidth of a communication channel, such as a twisted pair connection, into a number of frequency sub-channels. These sub-channels are also referred to as frequency bins or carriers. The DMT technique has been adopted by the ANSI T1E1.4 (ADSL) committee for use in ADSL systems. In ADSL, DMT is used to generate 250 separate 4.3125 kHz sub-channels from 260 kHz to 1.1 MHz for downstream transmission to the end user, and 26 sub-channels from 26 kHz to 138 kHz for upstream transmission by the end user. The transmission capabilities of the individual bins are evaluated for each connection, and data is allocated to the sub-channels according to their transmission capabilities (the number of bits each bin can support). Bins that are not capable of supporting data transmission are not used, while the bit-carrying capacity of bins that can support transmission can be maximized. Thus, by using DMT in an ADSL system, the transmission capability of each twisted pair connection can be maximized over the fixed bandwidth.

Application specific requirements need to be considered in determining the transmission capability of an ADSL system. For example, given a specific channel, an increase in data rate will cause an increase in the bit error rate. For some applications a higher bit error rate may be acceptable. However, other applications may not be tolerant of an increase in bit error rate and such applications require a higher performance margin. Performance margin is a measure of a system's immunity to an increase in noise. A system with a higher performance margin can handle a larger increase in noise on the communication channel and still maintain performance. For example, a performance margin of 6 dB indicates that a system can handle an increase of 6 dB in channel noise and still maintain its required bit error rate. The system performance of an ADSL system is dependent on its ability to accurately determine performance margins for an application specific data rate and bit error rate.

FIG. 1 illustrates a prior art ADSL system 10. ADSL system 10 comprises the remote terminal 20 coupled to the central office 30 via the twisted pair 15. Remote terminal 20 further comprises system controller 22 coupled to the remote terminal transceiver 24. Likewise, the central office 30 comprises the central office transceiver 32 coupled to the system controller 34. In the system 10 configuration illustrated, the transceivers 24, 34 would be configured to transmit at a specified data rate over the twisted pair 15. The system controllers 22 and 32 provide system control and data to the transceivers 24, 34.

In the prior art the central office 30 would transmit to the remote terminal 20 downstream options specifying data rates and configuration parameters. The downstream option would include the data rate and configuration information from the central office to the remote office. The downstream options generally comprise four data rates with configuration information for the remote terminal 20 to choose from. In the prior art, the remote terminal 20 would determine whether or not one of the four suggested data rate options met its requirements. In the event one of the data rate options was determined appropriate, the remote terminal would respond to the central office 30 specifying which data rate option was selected. In the event none of the suggested data rate options were determined appropriate, the remote terminal 20 would signal to the central office 30 that all options failed.

One limitation of the prior art is that even when one of the selected data rate options met the requirements of the remote terminal, the option may not be optimized. This occurs because the central office has blindly provided the remote terminal data rate options (blind options). The blind options provided by the central office 30 are especially troublesome when the remote terminal 20 is initiating the contact to the central office 30. When the remote terminal 20 initiates contact, the central office 30 is not aware of the requirements of the remote office. This would be the situation where the central office is capable of providing a number of different services via the ADSL system 10. Therefore, a data rate option may be accepted by the remote terminal which is not optimal.

Another suggested method of configuring an ADSL system 10 is for the central office 30 to provide initial blind options. Upon receiving the options from the central office 30, the remote terminal 20 would reject all options or select one. Where one is selected, the remote terminal would calculate a performance margin at that data rate, and return the performance margin to the central office 30. The central office, upon receiving the selected data rate and the corresponding performance margin, would then make a determination as to whether or not to transmit additional data rate suggestions to the remote terminal.

One reason for transmitting additional options is that there could be more channel capacity at a given performance margin than was allowed for in the original blind data rate options. As a result, the central office would select new options and transmit them to the remote terminal 20. In an iterative fashion, the remote terminal would select one of the options, and reply with the selected rate and a corresponding performance margin to the central office. In this manner, the central office has visibility into the remote terminal's capabilities. A problem with this method, however, is that being an iterative process, it is not deterministic and, therefore, can take an indeterminate amount of time. Even where the process converges to a used value, the amount of time taken could require a client to wait for initialization of the system.

Yet another suggested method in the prior art used to determine data rates and configure the ADSL system, would be a method using a signal-to-noise ratio (SNR) geometric to determine a transmit rate. However, one problem with the using the SNR geometric is the that the proposed calculation of the SNR geometric is a complex calculation requiring the multiplication of the SNR values of each individual carrier, and subsequently taking the Nth root of the calculated product. Note that the Nth route corresponds to N being equal to the number of channels used. This calculation is a very time consuming calculation slowing the overall system initialization process. In addition, the multiplication of the various SNRs, which can be fractions, would result in smaller and smaller products, thereby requiring special handling where fixed point processors are used.

Therefore, a method of efficiently determining and communicating parameters used for remote terminal and central office rate option selection is needed.

BRIEF DESCRIPTION OF THE DRAWINGS

FIG. 3. illustrates an SNR reference table.

Figure 1:
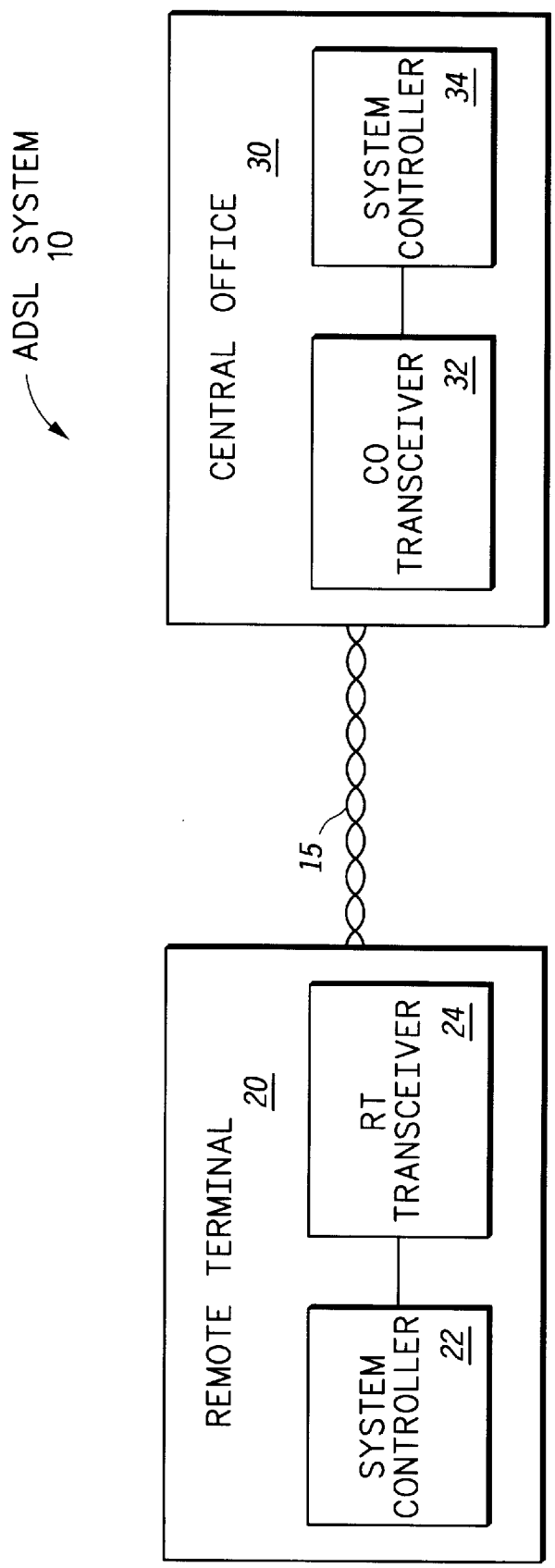
FIG. 1 illustrates, in block form, an ADSL system.

It will be appreciated that for simplicity and clarity of illustration, elements illustrated in the drawings have not necessarily been drawn to scale. For example, the dimensions of some of the elements are exaggerated relative to other elements for clarity. Further, where considered appropriate, reference numerals have been repeated among the drawings to indicate corresponding or analogous elements.

DESCRIPTION OF A PREFERRED EMBODIMENT

The present invention comprises a remote terminal and a central office as part of an ADSL system. Once a communication channel is open between the remote terminal and the central office, the remote terminal transmits channel specific information, application specific information, or both to the central office. Once the central office receives the information, the central office can select data rate options optimized for the downstream receiver (the remote terminal). Based on the application specific and/or channel specific information, the central office can use a combination of calculations and look-up tables to formulate new options. When the remote terminal sends channel specific information, the central office can perform calculations which determine performance margins at various data rates.

Figure 2:
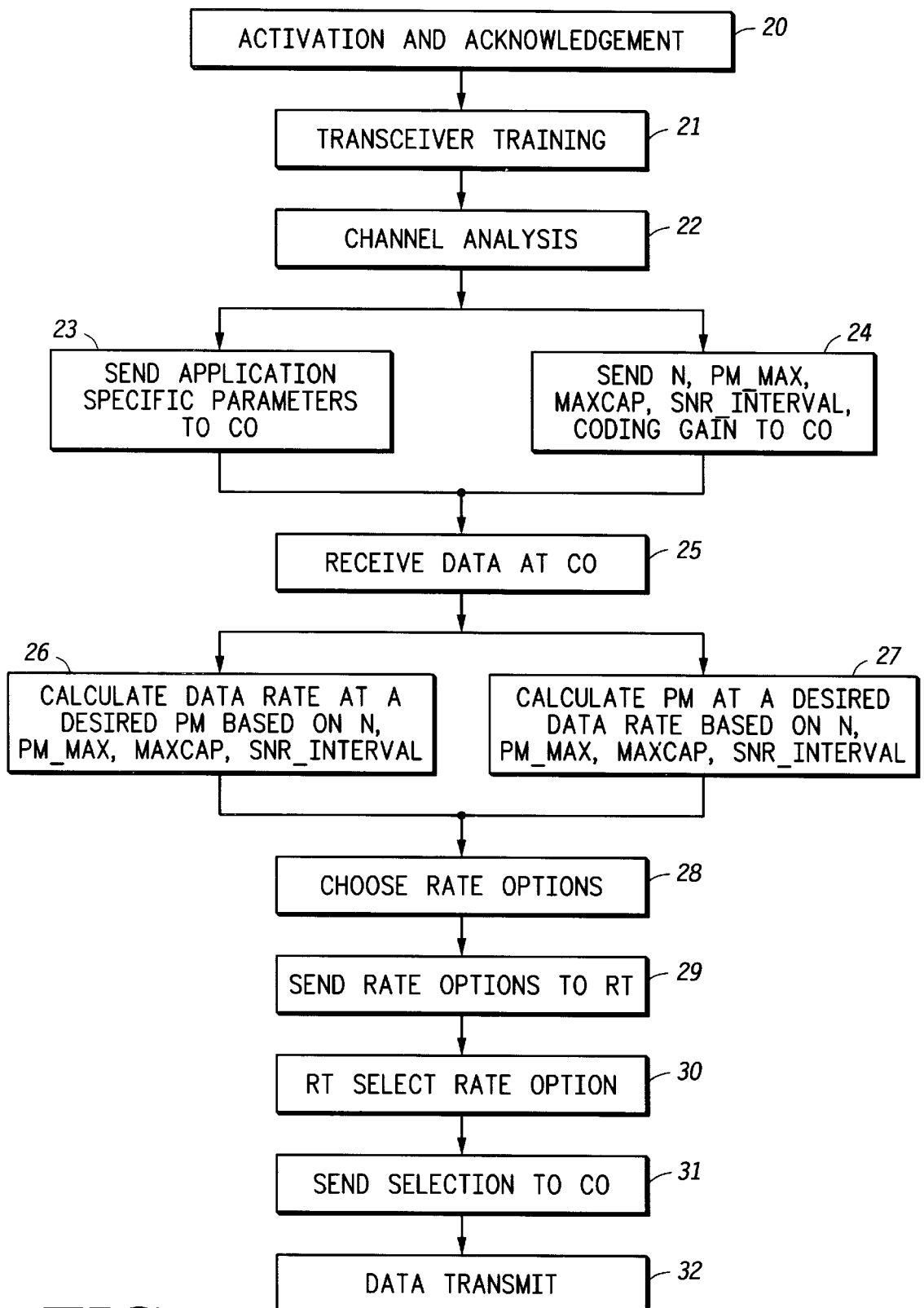
FIG. 2 illustrates, in flow diagram form, a method of efficiently configuring an ADSL system in accordance with the present invention.

FIG. 2 illustrates a specific embodiment or a method in accordance with the present invention. The method of FIG. 2, can be best understood with reference to the hardware of the prior art platform of FIG. 1. Steps 20 through 31 of the method of FIG. 2 represent an initialization of an ADSL system. At step 20, an activation and acknowledgment step 20 occurs. During step 20, either the remote terminal 20 or the central office 30 sends an activation signal in order to wake-up the other transceiver(s) that exist on the transmission media 15. Subsequent to an acknowledgment from the receiving source, a transceiver training step 21 occurs at both the activating transceiver and the acknowledging transceiver.

During the transceiver training at step 21, configuration information for the transceivers is exchanged. Next, at step 22, a channel analysis step is performed. During the channel analysis step, the carriers associated with the ADSL system 10 are analyzed at both the remote terminal and the central office. The remote terminal determines the downstream bit capacity of each downstream carrier, while the central office determines the upstream bit capacity of each upstream carrier. Next, at a step 24, an exchange step occurs.

In the illustrated embodiment of the present invention, the actual transmit rates are determined for the remote terminal and the central office during the exchange step. At step 23, the remote terminal sends application specific parameters to the central office. By sending application specific parameters to the central office, the central office can determine the data rate and the performance margin needed by doing a computation, using a look-up table, or both. The information stored in the look-up table would indicate the configurations needed for a specific application to perform properly. For example, if an internet connection is desired, the remote terminal would indicate its desire for that application by sending a predetermined configuration parameter. Subsequently, the central office could look-up the predefined ADSL system requirements and configure the system or rate options appropriately.

The actual application specific parameters would be an indication of the precise service being requested, such as internet service, video service, interactive banking, or other services. A second type of application specific parameters would be the desired data rate and performance margin needed by the remote terminal to use a specific application. In this embodiment, the central office would not necessarily be notified of the actual application which is to be used, only to the data configuration and/or performance margin requirements. In another embodiment the application specific parameters could include error correction coding parameters.

Step 24 indicates another embodiment of the present invention which can happen independently or in concurrence with step 23. At step 24, the remote terminal 20 sends channel-specific parameters to the central office. The channel specific parameters are parameters which are a function of the quality of the transmission channel that the remote terminal 20 is connected. The quality of this channel would be affected by noise and channel attenuation. The channel-specific parameters would include the number of carriers (N) used for a specific configuration, a given bit rate capacity (BRate) for the N carriers, the performance margin at the given bit rate capacity (PM(BRate)), the signal-to-noise ratio interval (SNR_int), as well as the coding gain. The transmission of this set of data represents an improvement over the prior art, where blind options were sent and lengthy calculations were used The number of carriers used is the number of carriers to be used by the remote terminal to achieve BRate. In a preferred embodiment, N is the number of carriers used to achieve the maximum BRate. A carrier may not be suitable for transmission due to the level of noise and/or attenuation at its specific frequency. Therefore, all of the downstream channels may not be available to the remote terminal 20. The number of carriers available (N) thereby would indicate the number of carriers suitable for transmission. While a preferred embodiment would indicate N as the maximum number of carriers available, it would also be possible for the remote terminal 20 to use N as a subset of the maximum number of carriers available. For example, the remote terminal may want to limit the number of carriers based upon other system considerations.

The performance margin for a given downstream transmit configuration, (PMgr) indicates how well the remote terminal receiver will perform. The actual determination of the performance margin is based upon system specifications. In one embodiment, the performance margin is based upon the worst carrier in a channel, where the worst carrier has the worst performance margin. In other words, if at a given data rate there are 100 possible carriers in a channel, and 99 of the carriers have a performance margin of two and one carrier has a performance margin of zero, the worst case performance margin would be reported back as 0 because that is the worst carrier performance margin associated with a specific channel. In other embodiments, different performance margins may be reported. For example, it may be desirable to provide an average performance margin by adding the performance margins of all carriers and dividing the sum by the number of carriers. The performance margin will be defined by the remote terminal system. In a specific embodiment, it could be desirable to report the performance margin at a maximum transmit rate corresponding to the maximum BRate and N.

The signal-to-noise interval (SNR_int) is the difference in SNR thresholds for a carrier given an incremental bit allocation. In other words, if a carrier going from five bits to six bits of data results in a SNR increase of three, the SNR interval value would be three for that incremental bit allocation. In one embodiment, an average SNR interval value is provided which would be representative of the expected incremental SNR increase across the entire system. In other embodiments, it would be possible to maintain a table indicating the actual incremental SNR increases between bits in given channels.

A configuration specific parameter provided by the remote terminal could be the coding gain. Coding gain represents the increase in performance when block coding and/or convolutional encoding are implemented. In ADSL, Reed-Soloman (block) forward error correction and Trellis (convolutional) coding are used to improve system performance. Coding gain can be mapped into dB, the same units as the performance margin. If the remote terminal provides the coding gain, which can be based on Trellis and Reed Soloman parameters communicated in the rate option configuration information, the central office has enough information to choose other configurations for the new set of data rate options.

Once the application specific information and/or the channel specific information has been determined, it is sent to the central office. At step 25, the information is received by the central office. Upon its receipt, the central office can use the information to calculate either a data rate, or a performance margin given the information. In addition, the calculation can be made in a time efficient manner.

At step 26, the data rate is being calculated by the central office based upon the information received by the remote terminal. The equation for determining a maximum data rate (Y) for a specified performance margin PM(Y) is defined by the equation:

$$Y = BRate - N*[PM(Y) - PM(BRate)]/SNR\_int. \quad (1)$$

Where PM(Y) is equal to the desired performance margin, PM(BRate) is equal to the performance margin at the BRate, N is the number of carriers used to transmit BRate bits, SNR_int is the incremental SNR for the system. Note that the use of this equation is advantageous over the prior art, in that it is a reduced complexity equation compared to the SNR geometric method.

If error correction coding schemes are used, PM(BRate) can be adjusted. Example: Assume that for a BRate data rate using N carriers the coded PM(BRate) (including coding gain) is 5 dB. Also assume that the coding gain, which is sent from the remote terminal, for this example is 3 dB (this can be derived from parameters in the data rate option). The PM(BRate) without error correction coding is approximately the coded PM(BRate)−coding gain=5 db−3 db=2 dB. The uncoded PM(BRate) is therefore 2 dB. If another data rate configuration is used that has a different coding gain, PM(BRate) can be adjusted to reflect this coding gain. The new coded PM(BRate)=the uncoded PM(BRate)+the new coding gain. Therefore, the calculation at step 26 can compute the data rate Y with a different coding gain than that which was used for PM(BRate) by subtracting the coding gain to get the uncoded PM(BRate) and then adding the new desired coding gain to the uncoded PM(BRate), resulting in a new coded PM(BRate). To obtain this new coding gain, the now coded PM(BRate) is substituted into the equation at step 26 for PM(BRate).

Analysis has indicated that use of the simple equation indicated provides results which, under normal conditions, very closely approximate the values determined by an actual allocation, with greater accuracy than the more complex SNR geometric method. This analysis consists of comparing the data from actual allocation results to the data computed from step 26 and prior art methods. Because the calculations can be implemented in a real time system, it is important that they can be done quickly. Although an actual allocation will provide exact data, actual allocations for all proposed data rate options can take more time than is available in a real time system. Actual allocation requires using a complicated bit loading calculation. In order to perform an actual bit loading calculation at the central office for the downstream direction all of the SNR values from the remote terminal would need to be transmitted to the central office. Once this information was transmitted, the central office would then have to go through a calculation on a carrier-by-carrier basis, which is time consuming, in order to determine what the optimal allocation should be. The present invention, however, based upon the simple equation presented, can very closely approximate the best case allocation with the use of just a few simple parameters.

The benefits of this calculation are two-fold: Fast, accurate performance estimates can be made at the receiver (remote office downstream or central office upstream), and, just a few parameters need to be communicated to the transmitter (remote office upstream or central office downstream) so that the same calculations can be done at the transmitter.

Step 27 is performed, when the central office needs to determine the performance margin with a specific data rate configuration. The performance margin can be calculated by the equation:

$$PM(Y) = SNR\_inc*[BRate - Y]/N + PM(BRate). \quad (2)$$

Wherein PM(Y) is the performance margin obtained at the specified data rate Y, PM(BRate) is the performance margin at the specified bit data rate (BRate), and N is the number of carriers used. Using this equation, it is possible for the central office to specify a desired data rate (Y) and calculate the performance margin PM(Y). As previously discussed, this equation provides an advantage over the prior art in that it uses a few simple parameters, and can calculate the performance margin much more quickly than calculating the performance margin based upon an actual calculation. In addition, analysis has shown that the present equation actually provides a more accurate approximation of the performance margin, than the methods of the prior art using the SNR geometric calculations.

As was previously discussed, PM(BRate) can be adjusted to generate PM(Y) at a different coding gain than was used for BRate.

In operation, the steps 26 and 27 may be mutually exclusive, or may be used simultaneously with the method of FIG. 2. For example, a specific embodiment may only use equation (1) from step 26. Conversely, other embodiments may use only equation (2) from step 27, or both equations (1) and (2).

Next, at step 28, the central office chooses rate options based upon the calculations performed in steps 26 and 27. The selection of the rate options is determined by system specifications. Generally, four data rates which closely approximate the values used to calculate the performance margin in equation (2), or the calculated rate from equation (1) are used. However, other applications may require that a larger range of data rate options be transmitted to the remote terminal. At step 29, the data rate options are transmitted to the remote terminal. At step 30, the remote terminal selects one of the data rate options. The selection process may utilize equation 1 or 2 or both to determine which option is appropriate. Additionally, in another embodiment, the central office may perform the actual selection and notify the remote terminal of that selection (this could be done even after the remote office selected an option, as the central office may have veto power).

At step 31, the selected data rate configuration information is transmitted back to the central office so that the transmitter/receiver operations are synchronized between the remote terminal and the central office. Following the completion of the initialization steps, represented by steps 20 through 32, the transmission of actual data can commence.

FIG. 3 illustrates a signal-to-noise ratio (SNR) table in accordance with the present invention. The BITS column represents the number of bits that are allocated to a bin. In the embodiment illustrated in FIG. 3, only 2 bits through 15 bits can be allocated to a bin. The SNRref column contains the signal-to-noise reference value, which represents a predetermined signal-to-noise value associated with each number of bits. The SNRref values of FIG. 3 are used later in the discussion of FIG. 4.

The SNRref for a given number of bits is the required SNR value which achieves a desired bit error rate, where the bit error rate is a measure of system performance. Initially, there is a base table that is specific to a selected BER, such as described in FIG. 3. In a system such as ADSL, error correction coding can be used to increase system performance. The increase in performance can be characterized by a coding gain. If error correction coding is used, a coding gain table can be added or subtracted from the base table, generating the SNRref table to be used during allocation. Raising the values of the table allows for an allocation with extra margin to counteract transmission channel degradation.

Figure 4:
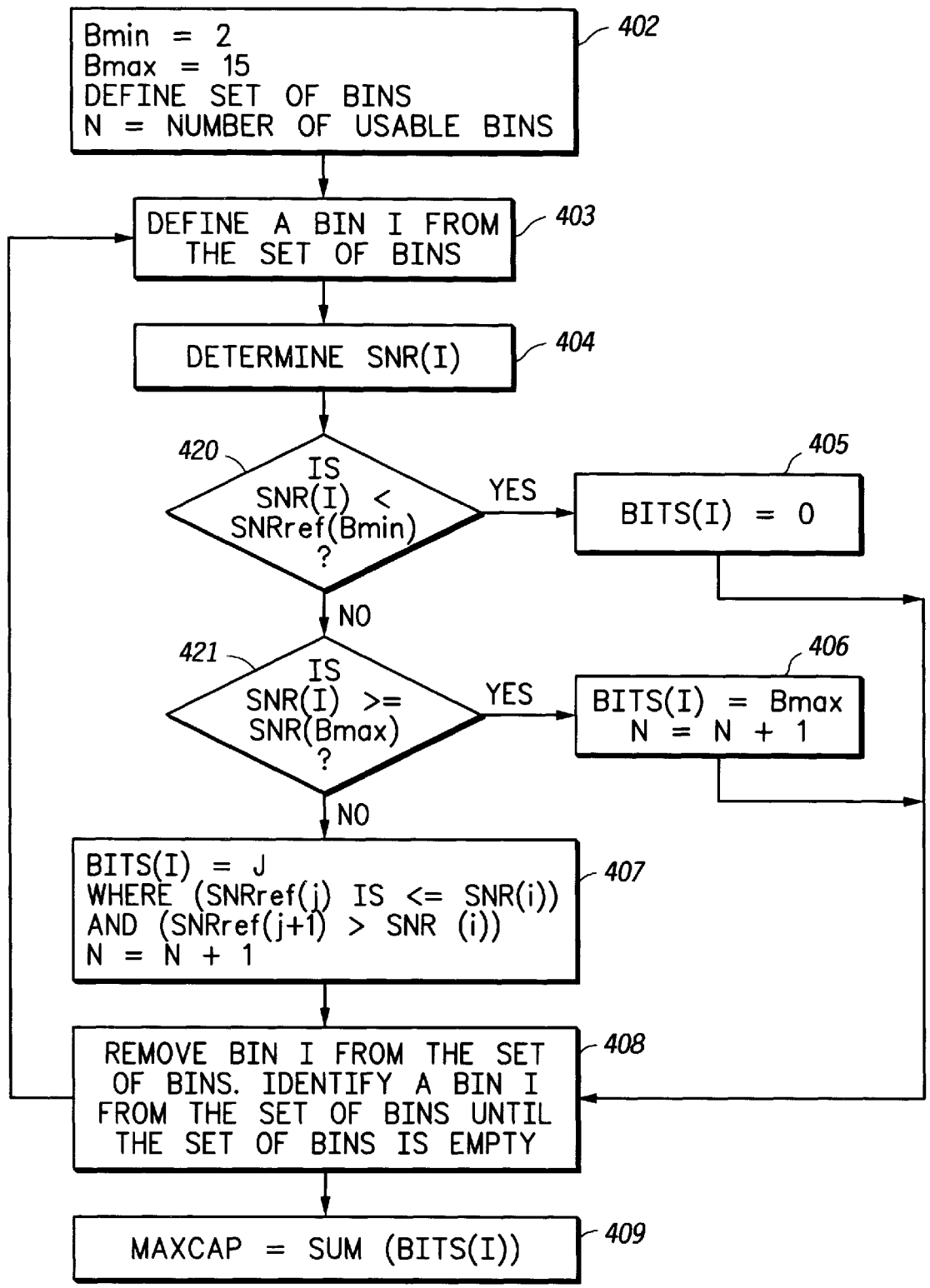
FIG. 4 illustrates, in flow diagram form, a method of calculating a maximum capacity using the SNR reference table of FIG. 3.

FIG. 4 illustrates a method for determining the maximum number of usable bins, and the maximum capacity in accordance with the present invention. At step 402, the minimum number of bits that can be allocated to a bin (Bmin) is defined to be 2 for a specific embodiment. The maximum number of bits that can be allocated to a bin (Bmax) is defined to be 15 for a specific embodiment. A set of bins containing all possible bins is defined. N is defined to be the number of usable bins.

Next, at step 403, a bin "I" is identified from the set of bins. Next, at step 404, the SNR value for the bin I (SNR(I)) is determined. This determination can be done by conventional calculations, or retrieved from a table. Next, at step 420, a determination is made whether SNR(I) is less than the SNR value of the minimum bit loading (SNRref(Bmin)) condition. If the determination of step 420 is true, then flow proceeds to step 405 where the number of bits capable of being stored in bin I (BITS(I)) is set to zero because the bit error rate cannot be met. Otherwise, when the determination of step 420 is false, the flow proceeds to step 421, where a determination is made whether SNR(I) is greater than the SNR value of the maximum bit loading (SNRref(Bmax)) condition. If the determination of step 421 is true, then flow proceeds to step 406 where the number of bits capable of being stored in bin I is set to Bmax, and the number of available bins is incremented.

If the determination of step 421 is false, then flow proceeds to step 407. At step 407, the number of bits stored in the bin I (BITS(I)) is determined from the SNR reference table of FIG. 3. This is accomplished by choosing the largest number of bits (J) having an SNRref value less than or equal to the SNR value associated with the bin SNR(I). BITS(I) is set equal to J, and N is incremented to indicated another usable bin. Flow continues at step 408 from steps 407, 405, and 406.

At step 408 the bin I is removed from the set of bins, so that it is not reconsidered, and a new bin I is identified if any bins remain. If bins do remain, flow proceeds to step 404. If no bins remain, the number of usable bins N has been determined, and flow proceeds to step 409 to determine the maximum bit capacity (MAXCAP) of the channel. MAXCAP is equal to the sum of the number of bits in each available bin.

The use of a SNR reference table provides an improvement over the prior art which has used calculations, as opposed to a reference table to determine the SNR at varying bit capacities.

Although the invention has been described and illustrated with reference to specific embodiments, it is not intended that the invention be limited to those illustrative embodiments. Those skilled in the art will recognize that modifications and variations may be made without departing from the spirit and scope of the invention. For example, individual steps 23 through 31 are illustrated as occurring after the steps 20, 21, 22, activation and acknowledgment, transceiver training, and channel analysis. Other embodiments would some or all of the steps 23 through 31 to occur between, or as part of, the steps 20, 21, 22. Furthermore, while the specific embodiment put forth herein discusses the central office receiving specific parameters and calculating a data rate, it would be anticipated by the present invention that a second embodiment would have the discussed roles of the central office and remote terminal reversed. Yet another embodiment of the present invention would use the equations for other purposes, such as to quickly determine a bit rate as part of a bit loading routine. Therefore, it is intended that this invention encompass all of the variations and modifications as fall within the scope of the appended claims.

What is claimed is:

1. A method of configuring a multicarrier communications device, the method comprising:
   providing a first data rate (X);
   providing a second data rate (Y);
   providing an incremental signal-to-noise ratio value (IS);
   providing a number of usable bins (N);
   providing a performance margin value at the first data rate value (PM(x)); and
   calculating a performance margin at the second data rate (PM(Y)) using an equation:

$$PM(Y)=IS(X-Y)/N+PM(x).$$

2. The method of claim 1, wherein the step of providing the first data rate further comprises providing the first data rate wherein the first data rate is a maximum data rate.

3. A method of configuring a multicarrier communications device, the method comprising:
   providing a first data rate (X);
   providing a desired performance margin at a second data rate (Y) (PM(Y))
   providing an incremental signal-to-noise ratio value (IS);
   providing a number of usable bins (N);
   providing a performance margin value at the first data rate value (PM(x)); and
   calculating the second data rate (Y) using an equation:

$$Y=X-N(PM(Y)-PM(X))/3.$$

4. The method of claim 3, wherein the step of providing the first data rate further comprises providing the first data rate wherein the first data rate is a maximum data rate.

5. A method of calculating a maximum capacity of a communications channel, the method comprising the steps of:
   setting a MAXCAP variable equal to zero;
   loading an SNR reference table, wherein the SNR reference table specifies an SNR value (SNRref(i)) for a bin at a given bit capacity (I);
   identifying a bin I (Bi), Bi having a SNR value of (SNR(Bi)); and
   adding a maximum number of bits (MaxBits) to MAXCAP if SNR(Bi) is greater than SNRref(MaxBits), where MaxBits is a maximum number of bits a communications carrier can hold; otherwise
   adding nothing to MAXCAP if SNR(Bi) is less than SNRref(MinBits), where MinBits is a minimum number of bits a communications carrier can hold; otherwise
   adding J bits to MAXCAP, where SNR(Bi) is less than or equal to SNRref(J) and greater that SiRref(J+1).

6. A method of claim 5, further comprising the step of:
   repeating the steps of identifying and adding until all bins in a set of bins have been operated upon.

7. A method of determining a capacity of a communications channel, the method comprising:
   initializing a capacity value;
   providing a signal to noise reference table, wherein the signal to noise reference table specifies a signal to noise reference value at a given bit capacity;
   identifying a bin of the communication channel; and
   adding a maximum number of bits to the capacity value if a signal to noise ratio for the identified bin is greater than the signal to noise ratio for a maximum number of bits the communications carrier can handle;
   adding nothing to the capacity value if the signal to noise ratio for the identified bin is less than the signal to noise ratio corresponding to a minimum number of bits the communications carrier can handle; otherwise
   adding a number of bits to the capacity value, the number of bits determined by comparing the signal to noise ratio for the identified bin to signal to noise values retrieved from the signal to noise reference table.

8. The method of claim 7, wherein the signal to noise ratio for the identified carrier is less than or equal to a signal to noise ratio for a first item from the signal to noise reference table and greater than a signal to noise ratio for a second item from the signal to noise reference table and wherein the number of bits added to the measured capacity corresponds to the first item from the signal to noise ratio table.

* * * * *